(12) United States Patent
Kalhan

(10) Patent No.: US 12,082,252 B2
(45) Date of Patent: Sep. 3, 2024

(54) RESERVED TIME-SLOTS LIST TO AVOID TRANSMISSION COLLISIONS IN VEHICLE-TO-VEHICLE COMMUNICATIONS

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 647 days.

(21) Appl. No.: 17/289,624

(22) PCT Filed: Nov. 1, 2019

(86) PCT No.: PCT/US2019/059416
§ 371 (c)(1),
(2) Date: Apr. 28, 2021

(87) PCT Pub. No.: WO2020/092919
PCT Pub. Date: May 7, 2020

(65) Prior Publication Data
US 2021/0400723 A1 Dec. 23, 2021

Related U.S. Application Data

(60) Provisional application No. 62/754,408, filed on Nov. 1, 2018, provisional application No. 62/754,393, filed on Nov. 1, 2018.

(51) Int. Cl.
*H04W 74/08* (2024.01)
*H04W 72/0446* (2023.01)
(Continued)

(52) U.S. Cl.
CPC ... *H04W 74/0816* (2013.01); *H04W 72/0446* (2013.01); *H04W 72/1263* (2013.01); *H04W 72/56* (2023.01); *H04W 92/18* (2013.01)

(58) Field of Classification Search
CPC ......... H04W 74/0816; H04W 72/0446; H04W 72/1263; H04W 72/56; H04W 92/18; H04W 74/04
See application file for complete search history.

(56) References Cited

U.S. PATENT DOCUMENTS

| | | | |
|---|---|---|---|
| 2011/0007672 A1* | 1/2011 | Park | H04W 16/14 370/280 |
| 2012/0120883 A1 | 5/2012 | Chen et al. | |
| 2015/0131637 A1* | 5/2015 | Rubin | G01C 21/26 370/337 |

FOREIGN PATENT DOCUMENTS

WO 2011-053357 A1 5/2011

OTHER PUBLICATIONS

Nguyen, Vandung, Tran Anh Khoa, Thant Zin Oo, Nguyen H. Tran, Choong Seon Hong, and Eui-Nam Huh; "Time Slot Utilization for Efficient Multi-Channel MAC Protocol in VANETs"; Sensors 2018; doi:10.3390/s18093028; Sep. 10, 2018 [Retrieved on: Feb. 7, 2020]. Retrieved from the Internet: <URL: https://www.ncbi.nlm.nih.gov/pmc/articles/PMC6165098/pdf/sensors-18-03028.pdf>.
(Continued)

*Primary Examiner* — John D Blanton

(57) ABSTRACT

The methods and systems discussed herein describe how a wireless communication device obtains a reserved time-slot list (RTS-list) to avoid "merging collisions." In some examples, a first wireless communication device indirectly obtains the RTS-list from a second wireless communication device with which the first wireless communication device may have a potential "merging collision." In other examples, a first wireless communication device receives an RTS-list from each of a plurality (or all) of the neighboring wireless communication devices in the VANET and refrains from transmitting data in the time-slots identified in the received RTS-lists. The first wireless communication device may also
(Continued)

generate and broadcast an RTS-list that contains the reserved time-slots that were identified in the received RTS-lists. In still further examples, abase station transmits an RTS-list to one or more of the wireless communication devices in order to help avoid "merging collisions."

12 Claims, 6 Drawing Sheets

(51) Int. Cl.
*H04W 72/1263* (2023.01)
*H04W 72/56* (2023.01)
*H04W 74/0816* (2024.01)
*H04W 92/18* (2009.01)

(56) References Cited

OTHER PUBLICATIONS

Khan, Faisal Ahmad; "Safety-Message Routing in Vehicular ADHOC Networks"; Electrical and Computer Engineering, Georgia Institute of Technology, May 2013 [Retrieved on: Feb. 5, 2020]. Retrieved from the Internet: <URL: https://smartech.gatech.edu/bitstream/handle/1853/47743/khan_faisal_a_201212_phd.pdf>.

Singh, Ranbir and Kulwinder Singh Mann; "Efficient Time Slot Allocation to Minimize Collision in TDMA Based VANETs"; Journal of Network Communications and Emerging Technologies (JNCET), vol. 7, Issue 12; Dec. 2017; pp. 40-47 [Retrieveon: Feb. 7, 2020]. Retrieved from the Internet: <URL: https://pclfs.semanticscholar.org/6a92/0aafbf0785ba5099ed7ea6437f8bba7450bf.pclf>.

* cited by examiner

RESERVED TIME-SLOTS LIST TO AVOID TRANSMISSION COLLISIONS IN VEHICLE-TO-VEHICLE COMMUNICATIONS

CLAIM OF PRIORITY

The present application claims priority to Provisional Application No. 62/754,393, entitled "VEHICLE-TO-VEHICLE UNICAST/GROUPCAST COMMUNICATIONS BASED ON THE PERIODIC DISCOVERY CHANNEL BROADCAST", filed Nov. 1, 2018, and to Provisional Application No. 62/754,408, entitled "RESERVED TIME-SLOTS LIST TO AVOID TRANSMISSION COLLISIONS IN VEHICLE-TO-VEHICLE COMMUNICATIONS", filed Nov. 1, 2018, both assigned to the assignee hereof and hereby expressly incorporated by reference in their entirety.

FIELD

This invention generally relates to wireless communications and more particularly to vehicle-to-everything (V2X) communications between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

The methods and systems discussed herein describe how a wireless communication device obtains a reserved time-slot list (RTS-list) to avoid "merging collisions." In some examples, a first wireless communication device indirectly obtains the RTS-list from a second wireless communication device with which the first wireless communication device may have a potential "merging collision." In other examples, a first wireless communication device receives an RTS-list from each of a plurality (or all) of the neighboring wireless communication devices in the VANET and refrains from transmitting data in the time-slots identified in the received RTS-lists. The first wireless communication device may also generate and broadcast an RTS-list that contains the reserved time-slots that were identified in the received RTS-lists. In still further examples, a base station transmits an RTS-list to one or more of the wireless communication devices in order to help avoid "merging collisions."

DETAILED DESCRIPTION

Figure 1A:
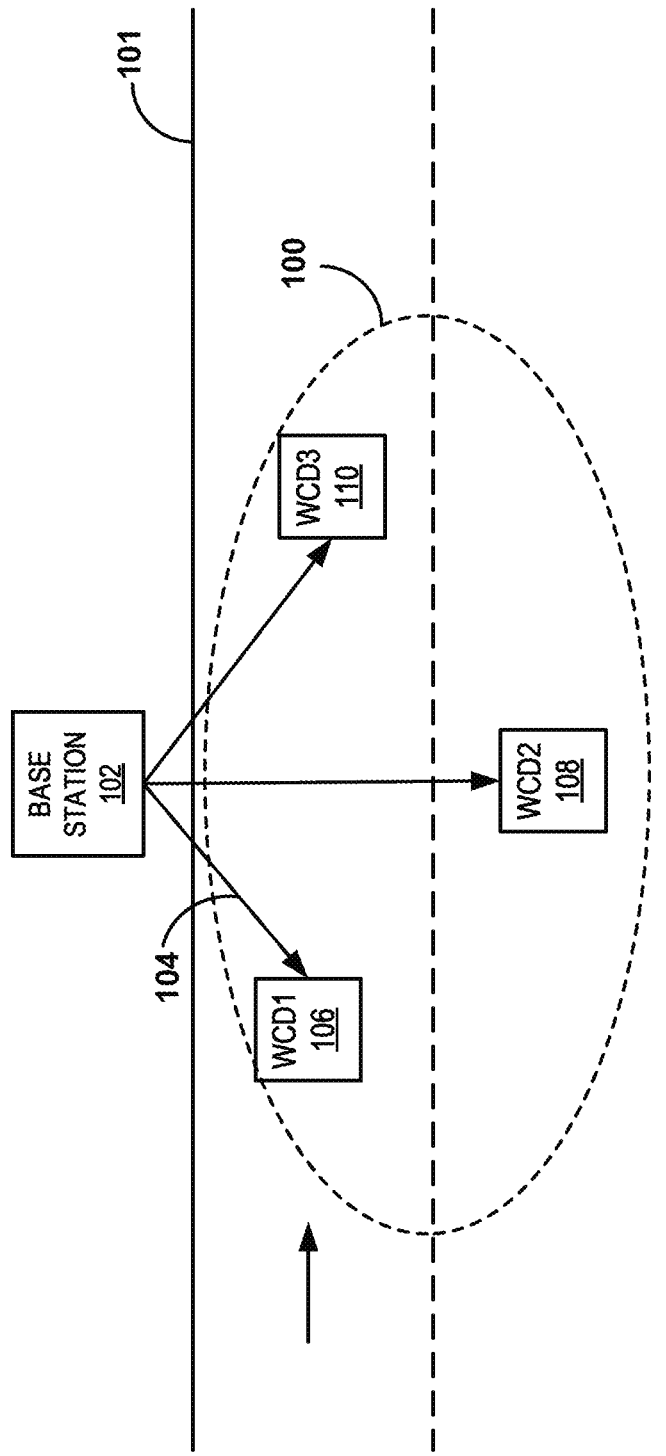
FIG. 1A is a block diagram of an example of a system in which a plurality of wireless communication devices are nodes of a vehicle ad-hoc network (VANET).

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

In order to avoid data transmission collisions in the VANET, the wireless communication devices interested in data transmission first perform energy-sensing during a set of time-slots to find unused time-slots. Once an unused time-slot is found and selected, the wireless communication device uses the selected time-slot for data transmissions. The energy-sensing technique works very well when all the transmissions are periodic.

For example, after sensing for only one period, the wireless communication devices are able to identify the unused time-slots that can be used for their own data transmissions. In these examples, a wireless communication device transmits a periodic message in the $n^{th}$ time-slot of a frame, where a frame has N time-slots. Based on the periodicity of the transmissions, the neighboring wireless communication devices are able to predict that the transmitting wireless communication device's subsequent data transmissions would occur at the $(n+N)^{th}$, $(n+2N)^{th}$, ..., $(n+KN)^{th}$ time-slots. Hence, the neighboring wireless communication devices refrain from selecting the $(n+N)^{th}$, $(n+2N)^{th}$, ..., $(n+KN)^{th}$ time-slots for their data transmissions. To achieve fairness, the time-slot ownership expires after the $K^{th}$ transmission. If the transmitting wireless communication device has a new data packet to transmit, then the transmitting wireless communication device repeats the energy-sensing and selection procedure to find a new, unused time-slot.

Although the sensing method allows the wireless communication devices to select the unused time-slots, it is still possible for the data transmissions to collide due to the mobility of the wireless communication devices. For example, a "merging collision" occurs when a first wireless communication device moves into a region where there is already a second wireless communication device using the same time-slot as the first wireless communication device. For example, as shown in FIG. 1B, a "merging collision" would happen when the accelerating wireless communication device 106 is about to enter the coverage area 111 of wireless communication device 110 and both wireless communication devices 106, 110 happen to be using the same time-slot, $t_m$, for their respective data transmissions. The sensing method, described above, does not help avoid the "merging collision" in this scenario because wireless communication device 106 will not detect the out-of-range wireless communication device 110.

The methods and systems discussed herein describe how a wireless communication device obtains a reserved time-slot list (RTS-list) ahead of time to avoid "merging collisions." In some examples, a first wireless communication device indirectly obtains the reserved time-slot list from a second wireless communication device with which the first wireless communication device may have a potential "merging collision." In other examples, a first wireless communication device receives an RTS-list from each of a plurality (or all) of the neighboring wireless communication devices in the VANET and refrains from transmitting data in the time-slots identified in the received RTS-lists. The first wireless communication device may also generate and broadcast an RTS-list that contains the reserved time-slots that were identified in the received RTS-lists. In still further examples, a base station transmits a reserved time-slot list to one or more of the wireless communication devices in order to help avoid "merging collisions."

For the examples described herein, it is assumed that the wireless communication devices are equipped with a Global Positioning System (GPS) receiver and that synchronization among the wireless communication devices is performed using the one pulse-per-second (1PPS) signal provided by the GPS receiver. Using the 1PPS signal, the wireless communication devices obtain common reference timing, synchronized with each other and become aware of the frame-boundaries. Each frame consists of a constant number of fixed duration time-slots (e.g., the duration of each frame is 100 milliseconds long where each time-slot within the frame is 0.5 ms, resulting in 200 time-slots per frame). As a result, every wireless communication device has the knowledge of the frame-number and time-slot-number.

Figure 1B:
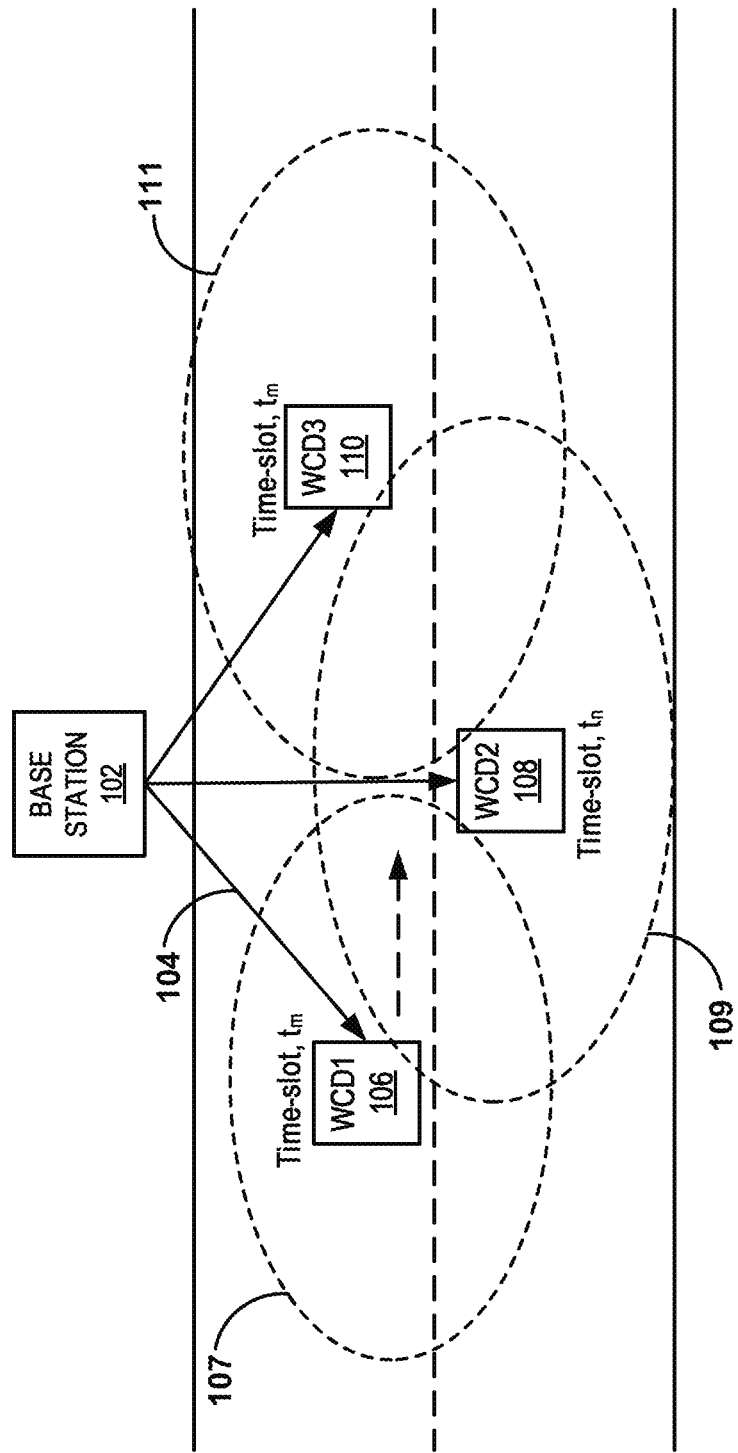
FIG. 1B is a block diagram of an example of a system in which the wireless communication devices of FIG. 1A are using reserved time-slot lists to avoid data transmission collisions in the VANET.

FIG. 1A is a block diagram of an example of a system in which a plurality of wireless communication devices are nodes of a vehicle ad-hoc network (VANET). For the example of FIG. 1A, VANET 100 is located on roadway 101 and includes first wireless communication device, WCD1, 106, second wireless communication device, WCD2, 108, and third wireless communication device, WCD3, 110. In other examples, VANET 100 may have a different number of wireless communication devices than that shown in FIG. 1A.

VANET 100 is wirelessly connected to a radio access network (not shown) via an infrastructure communication node (e.g., base station 102 or a road side unit (RSU)), which provides various wireless services to one or more of the wireless communication devices that are part of VANET 100. For the example shown in FIG. 1A, VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one infrastructure communication node (e.g., base station 102) is shown in FIG. 1A. However, in other examples, any suitable number of infrastructure communication nodes may be utilized by VANET 100 in order to obtain/maintain communication with the network. For the example shown in FIG. 1A, base station 102, sometimes referred to as eNodeB or eNB, communicates with wireless communication devices 106, 108, 110 via wireless communication link 104. As referenced earlier, the infrastructure communication node is a road side unit (RSU), in other examples.

For the example shown in FIG. 1A, wireless communication link 104 is shown as a broadcast downlink signal from base station 102 to wireless communication devices 106, 108, 110. Wireless communication devices 106, 108, 110 are also capable of transmitting uplink signals (not shown) to base station 102. In the example of FIG. 1A, wireless communication devices 106, 108, 110 are each integrated into a vehicle as an onboard unit (OBU). In other examples, wireless communication devices 106, 108, 110 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110 that is connected to VANET 100 is considered to be a node of VANET 100. As indicated by the arrow in FIG. 1A, the vehicles in which wireless communication devices 106, 108, 110 are located are traveling from left to right on roadway 101.

Figure 2A:
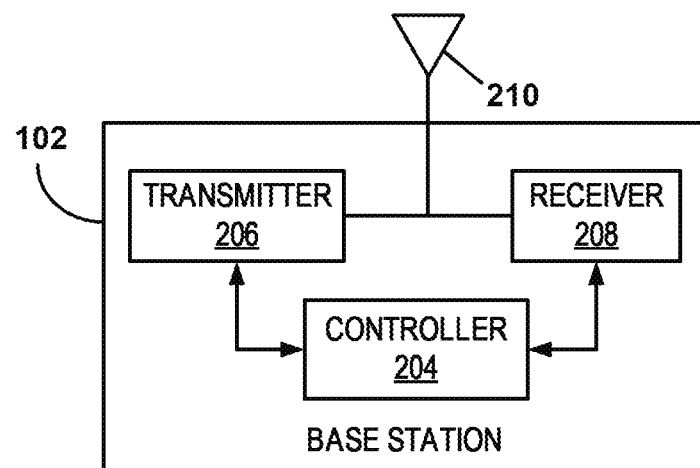
FIG. 2A is a block diagram of an example of the base station shown in FIG. 1A.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, and (2) network connectivity to VANET 100. Base station 102 provides these services and connectivity by transmitting downlink signal 104, via transmitter 206 and antenna 210, to wireless communication devices 106, 108, 110. In the example of FIG. 1A, the downlink signal 104 is transmitted in a System Information Block (SIB) message that is broadcast to all wireless communication devices 106, 108, 110 that are nodes of VANET 100. Although not explicitly shown in FIG. 1A, base station 102 is capable of receiving uplink signals, via antenna 210 and receiver 208, from wireless communication devices 106, 108, 110.

Figure 2B:
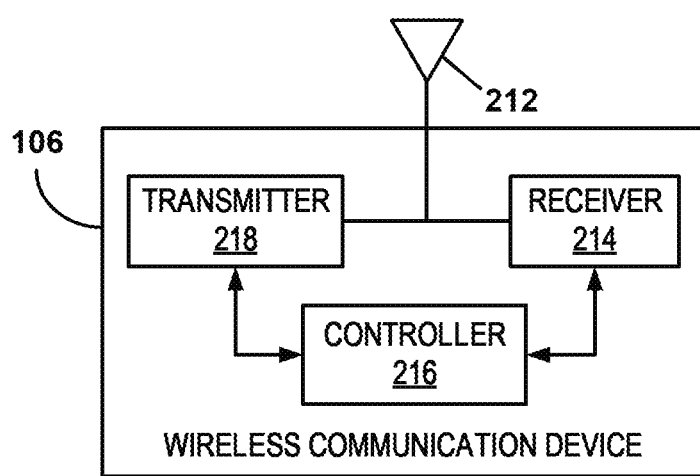
FIG. 2B is a block diagram of an example of a wireless communication device shown in FIG. 1A.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers.

Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

In some examples, a wireless communication device indirectly obtains a reserved time-slot list from another wireless communication device with which the wireless communication device may have a potential "merging collision." For example, FIG. 1B shows a scenario where there is a possibility of a "merging collision" between wireless communication device 106 and wireless communication device 110. Direct communication of a reserved time-slot list between wireless communication devices 106 and 110 is not possible since coverage area 107 of wireless communication device 106 cannot reach wireless communication device 110. Similarly, coverage area 111 of wireless communication device 110 cannot reach wireless communication device 106. However, coverage area 109 of wireless communication device 108 can reach both wireless communication device 106 and wireless communication device 110.

As wireless communication device 106 accelerates (e.g., from left to right, as shown by the dashed arrow) and gets closer to wireless communication device 110, there is a possibility of a "merging collision" to occur in time-slot $t_m$, which is being used by both wireless communication devices 106, 110 for data transmissions. Wireless communication device 108 receives a reserved time-slot list from wireless communication device 110. The reserved time-slot list identifies one or more time-slots, including time-slot $t_m$, that have been reserved for data transmissions within the VANET. Wireless communication device 108 broadcasts the reserved time-slot list to other wireless communication devices in VANET 100. Wireless communication device 106 receives the reserved time-slot list that was broadcast from wireless communication device 108. Since time-slot $t_m$ is listed as one of the reserved time-slots being used by neighboring wireless communication devices, wireless communication device 106 refrains from transmitting data in time-slot $t_m$ and starts the process of selecting an unused time-slot. As a result, the "merging collision" is avoided.

Consider the same scenario as shown in FIG. 1B except that wireless communication device 106 is now within direct communication range of both wireless communication device 108 and wireless communication device 110. In this scenario, wireless communication device 106 can receive a reserved time-slot list (RTS-list) from a plurality (or all) of the neighboring wireless communication devices in VANET 100. For example, wireless communication device 106 receives, from wireless communication device 108, a first RTS-list that identifies one or more time-slots that have been reserved for data transmissions within VANET 100. Wireless communication device 106 also receives, from wireless communication device 110, a second RTS-list that identifies one or more time-slots that have been reserved for data transmissions within VANET 100. In some cases, there may be some overlap of the reserved time-slots that are included in the first and second RTS-lists. In order to avoid possible data collisions, wireless communication device 106 refrains from transmitting data during the reserved time-slots that were identified in the first reserved time-slot list and the second reserved time-slot list.

In some examples, wireless communication device 106 generates its own RTS-list that contains all of the reserved time-slots that were identified in the RTS-lists received from the other wireless communication devices 108, 110. As mentioned above, some of the reserved time-slots listed in the RTS-lists received from the neighboring wireless communication devices 108, 110 will be common because many of the neighboring wireless communication devices have common neighbors. After forming its own RTS-list, wireless communication device 106 broadcasts its own RTS-list to other wireless communication devices in VANET 100. In some examples, wireless communication device 106 broadcasts its own RTS-list in a periodic discovery channel message.

Figure 3:
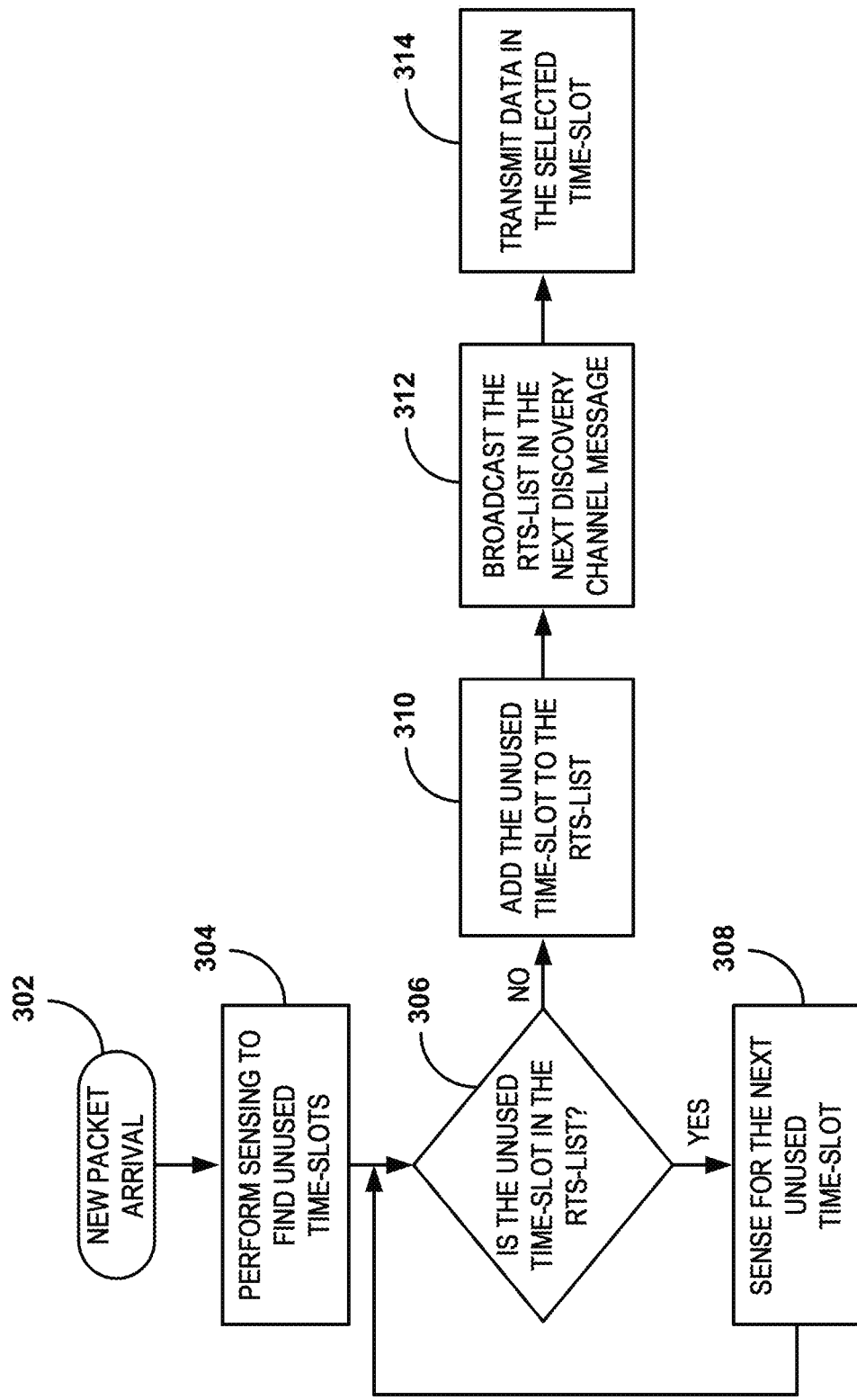
FIG. 3 is a flowchart of an example of how a wireless communication device selects an unused time-slot and transmits data during the selected time-slot.

FIG. 3 is a flowchart of an example of how a wireless communication device selects an unused time-slot and transmits data during the selected time-slot. For example, at step 302, a new data packet arrives in a data buffer (not shown) of wireless communication device 106. Before transmitting, wireless communication device 106 employs a sensing process, at step 304, to find one or more unused time-slots.

At decision block 306, wireless communication device 106 determines whether one or more of the unused time-slots, which were sensed at step 304, are in the RTS-list of wireless communication device 106. As mentioned above, the RTS-list is the list of reserved time-slots that wireless communication device 106 cannot select for transmitting the data packet. If an unused time-slot is in the RTS-list of wireless communication device 106, wireless communication device 106 continues to sense for a next unused time-slot, at step 308.

If the unused time-slot is not in the RTS-list of wireless communication device 106, wireless communication device 106 updates its own RTS-list by adding the unused time-slot to the RTS-list of wireless communication device 106, at step 310. Wireless communication device 106 broadcasts its updated RTS-list in a next periodic discovery channel message, at step 312, before transmitting data in the selected, unused time-slot. In this manner, by broadcasting its updated RTS-list before transmitting data, wireless communication device 106 implicitly reserves the selected, unused time-slot for future data transmissions. Wireless communication device 106 transmits data in the selected, unused time-slot, at step 314.

In some examples, the wireless communication devices must not skip their RTS-list broadcast, even if a wireless communication device does not have any data to transmit or if the RTS-list is unchanged from the previous broadcast. The un-skipped RTS-list broadcast is essential since the neighboring wireless communication devices rely on each other's RTS-list broadcast to maintain their own updated and accurate RTS-list. In other examples, the RTS-list broadcasting is initiated by one or more of the following triggering events: acceleration of a wireless communication device, deceleration of a wireless communication device, a determination that a wireless communication device is to be handed over, or some other factors.

In some examples, if the updated RTS-list of a wireless communication device includes the same time-slot that the wireless communication device has been using for its own data transmissions, then the wireless communication device performs a time-slot reselection. For example, as shown in FIG. 1B, wireless communication devices 106, 110 both use the time-slot $t_m$ for their respective data transmissions. In this scenario, wireless communication device 106 receives the RTS-list $\{t_m, t_n\}$ from wireless communication device 110. The RTS-list $\{t_m, t_n\}$ from wireless communication device 110 includes (1) $t_m$ since wireless communication device 110 is using $t_m$ for its own data transmissions, and (2) $t_n$ since neighboring wireless communication device 108 is using $t_n$ for its data transmissions. Wireless communication device 106 updates its own RTS-list by adding the time-slots (e.g., $t_m$ and $t_n$) identified in the RTS-list received from wireless communication device 110. Wireless communication device 106 then checks to see if its new, updated RTS-list contains the time-slot (e.g., $t_m$) that wireless communication device 106 is using for data transmissions. If the updated RTS-list of wireless communication device 106 contains time-slot $t_m$, wireless communication device 106 refrains from using the time-slot $t_m$ for future data transmissions. Wireless communication device 106 then performs a reselection process to select a new, unused time-slot for future data transmissions. In some examples, the reselection process is the same as the initial process utilized to reserve a time-slot, as described above.

In other examples, wireless communication device 110 could also perform a reselection process after receiving the same RTS-list $\{t_m, t_n\}$ from wireless communication device 108. This result would only be problematic if both wireless communication devices 106, 110 re-select the same, new time-slot.

In further examples, if a time-slot that is included in the RTS-list of wireless communication device 106 is not reported in any of the RTS-lists received from neighboring wireless communication devices 108, 110, then wireless communication device 106 de-lists (e.g., removes) the time-slot from its own RTS-list. Wireless communication device 106 may also de-list its own reserved time-slot from its own RTS-list upon a determination that wireless communication device 106 is no longer interested in transmitting data, or upon expiration of the wireless communication device's ownership of the reserved time-slot.

If VANET 100 is in cellular network coverage, then wireless communication devices 106, 108, 110 could use the network's reference timing (e.g., LTE or 5G NR primary synchronization signal (PSS)/secondary synchronization signal (SSS)) as the common reference time. Each wireless communication device 106, 108, 110 has a cellular connection, as well.

In some examples, when wireless communication device 106, 108, 110 are exchanging RTS-lists, each wireless communication device 106, 108, 110 also includes one or more of the following in their respective RTS-list broadcasts: a cell identifier (cell ID), a frame-offset, a priority of the data to be transmitted, and/or a Quality of Service (QoS) of the data to be transmitted. This is essential if the neighboring wireless communication device are served by a different operator and/or different serving cell base stations. For example, each base station may have a different frame numbering. Thus, the wireless communication devices may need to take the cell ID, the offset, and/or the priority/QoS of the data into account to identify the reserved time-slots from a wireless communication device served by a different base station.

In other examples, base station 102 transmits an RTS-list to one or more of the wireless communication devices 106, 108, 110 in order to help avoid "merging collisions." More specifically, each of the wireless communication devices 106, 108, 110 autonomously selects and reserve their own time-slots for data transmission. The wireless communication devices 106, 108, 110 report (e.g., transmit) their selected time-slot to their respective serving cell base station 102 before transmitting data. Based on this reporting from the wireless communication devices 106, 108, 110, the serving cell base station 102 generates an RTS-list and periodically broadcasts the RTS-list to the interested wireless communication devices 106, 108, 110 within a region (e.g., broadcast using single-cell point-to-multipoint (SC-PTM)). After receiving the RTS-list on the serving cell downlink 104, the wireless communication devices 106, 108, 110 each update their own internal RTS-list. In the cellular network, the RTS-list could be cell-specific and/or group-ID-specific (e.g. group identifier-specific). Thus, in these examples, the wireless communication devices 106, 108, 110 do not need to broadcast the RTS-list to each other.

Figure 4:
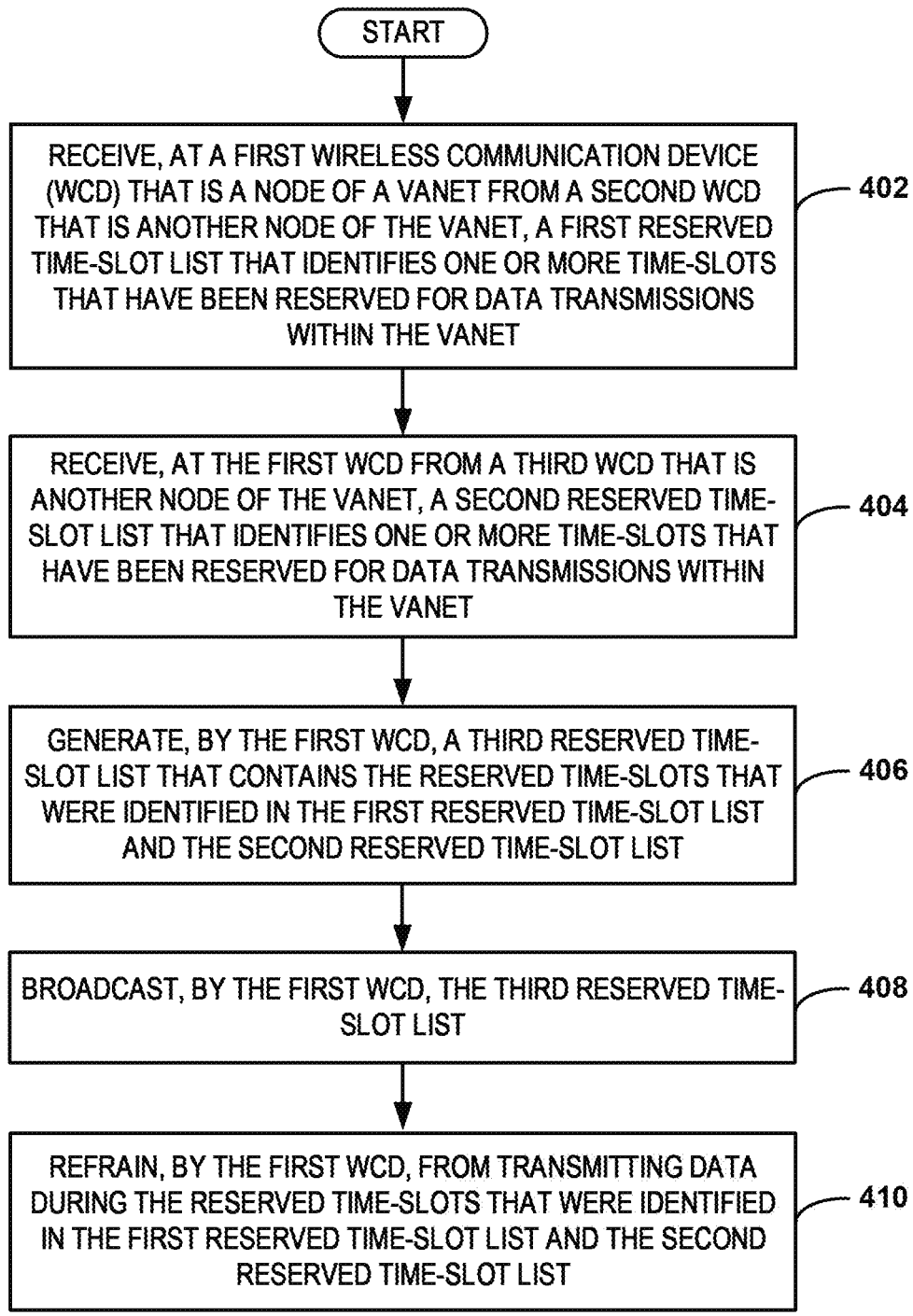
FIG. 4 is a flowchart of an example of a method in which a first wireless communication device receives and utilizes first and second reserved time-slot lists to generate a third time-slot list that contains the reserved time-slots that were identified in the first and second reserved time-slot lists. The first wireless communication device refrains from transmitting data during the reserved time-slots that were identified in the first and second reserved time-slot lists.

FIG. 4 is a flowchart of an example of a method in which a first wireless communication device receives and utilizes first and second reserved time-slot lists to generate a third time-slot list that contains the reserved time-slots that were identified in the first and second reserved time-slot lists. The first wireless communication device refrains from transmitting data during the reserved time-slots that were identified in the first and second reserved time-slot lists. The method 400 begins at step 402 with receiving, at first wireless communication device 106, which is a node of VANET 100, from second wireless communication device 108, a first reserved time-slot list that identifies one or more time-slots that have been reserved for data transmissions within VANET 100. At step 404, first wireless communication device 106 receives, from third wireless communication device 110, which is another node of VANET 100, a second reserved time-slot list that identifies one or more time-slots that have been reserved for data transmissions within VANET 100. At step 406, first wireless communication device 106 generates a third reserved time-slot list that contains the reserved time-slots that were identified in the first reserved time-slot list and the second reserved time-slot list. At step 408, first wireless communication device 106 broadcasts the third reserved time-slot list. At step 410, first wireless communication device 106 refrains from transmitting data during the reserved time-slots that were identified in the first reserved time-slot list and the second reserved time-slot list. In some examples, first wireless communication device 106 may determine whether to refrain from transmitting based, at least partially, on a priority level assigned to the data to be transmitted from first wireless communication device 106. For example, if the data to be transmitted from first wireless communication device 106 has a low priority, then first wireless communication device 106 may determine to refrain from transmitting. However, if the data to be transmitted from first wireless communication device 106 has a high priority (e.g., a safety message), then first wireless communication device 106 may determine to transmit the data. In other examples, first wireless communication device 106 may determine whether to refrain from transmitting based, at least partially, on a comparison between the priority level assigned to the data to be transmitted from first wireless communication device 106 and the priority level assigned to data to be transmitted by second wireless communication device 108. Thus, if first wireless communication device 106 and second wireless communication device 108 both happen to reserve the same time-slot, the wireless communication device with the lower priority data will refrain from transmitting. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Figure 5:
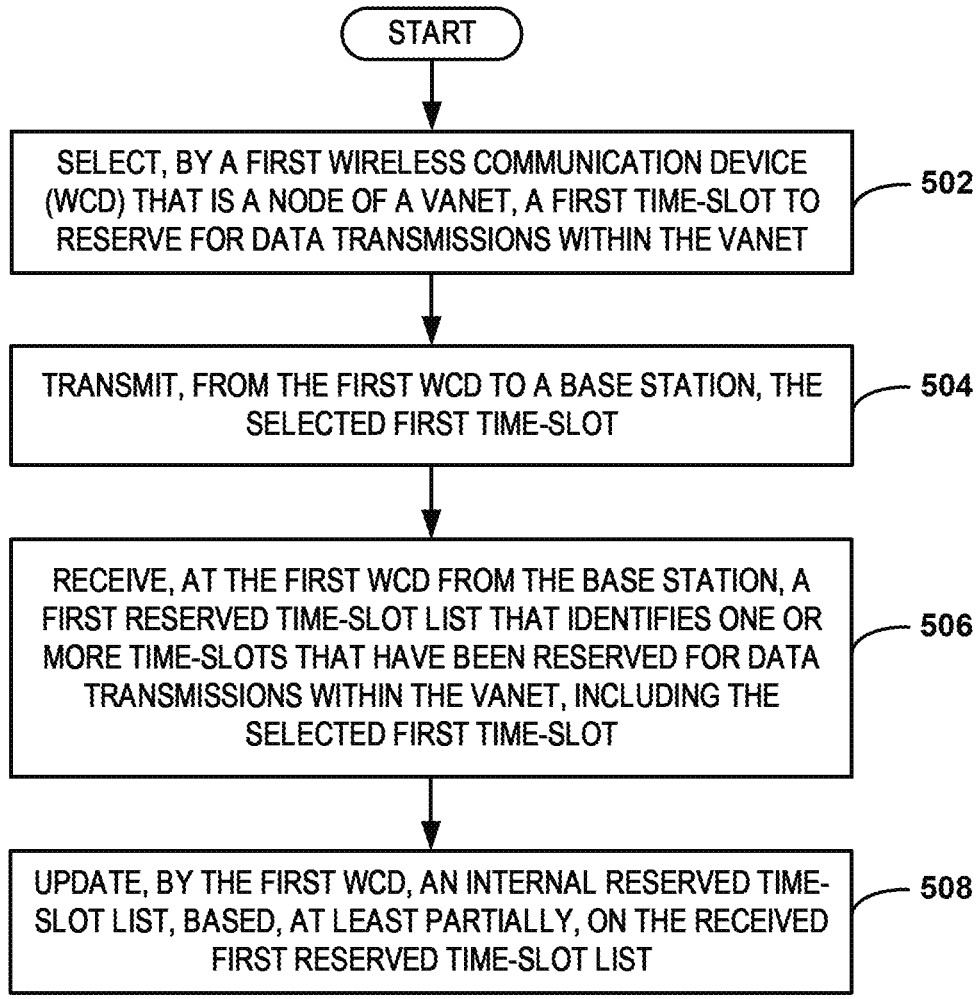
FIG. 5 is a flowchart of an example of a method in which a first wireless communication device utilizes a first reserved time-slot list, received from a base station, to update an internal reserved time-slot list.

FIG. 5 is a flowchart of an example of a method in which a first wireless communication device utilizes a first reserved time-slot list, received from a base station, to update an internal reserved time-slot list. The method 500 begins at step 502 with selecting, by first wireless communication device 106, which is a node of VANET 100, a first time-slot to reserve for data transmissions within VANET 100. At step 504, first wireless communication device 106 transmits, to base station 102, the selected first time-slot. At step 506, first wireless communication device 106 receives, from base station 102, a first reserved time-slot list that identifies one or more time-slots that have been reserved for data transmissions within VANET 100, including the selected first time-slot. At step 508, first wireless communication device 106 updates an internal reserved time-slot list based, at least partially, on the received first reserved time-slot list. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
receiving, at a first wireless communication device that is a node of a vehicle ad-hoc network (VANET) from a second wireless communication device that is another node of the VANET, a first reserved time-slot list that identifies one or more time-slots that have been reserved for data transmissions within the VANET;
receiving, at the first wireless communication device from a third wireless communication device that is another node of the VANET, a second reserved time-slot list that identifies one or more time-slots that have been reserved for data transmissions within the VANET;
generating, by the first wireless communication device, a third reserved time-slot list that contains the reserved time-slots that were identified in the first reserved time-slot list and the second reserved time-slot list;
broadcasting, by the first wireless communication device, the third reserved time-slot list, wherein broadcasting the third reserved time-slot list is triggered by one or more of the following: acceleration of the first wireless communication device, deceleration of the first wireless communication device, and a determination that the first wireless communication device is to be handed over; and refraining, by the first wireless communication device, from transmitting data during the reserved time-slots that were identified in the first reserved time-slot list and the second reserved time-slot list.

2. The method of claim 1, wherein the broadcasting comprises broadcasting the third reserved time-slot list in a periodic discovery channel message.

3. The method of claim 1, wherein the broadcast of the third reserved time-slot list includes one or more of the following: a cell identifier, a frame-offset, a priority of the data to be transmitted, and a Quality of Service (QOS) of the data to be transmitted.

4. The method of claim 1, further comprising:
if the third reserved time-slot list contains a first time-slot being used by the first wireless communication device for data transmissions, refraining, by the first wireless communication device, from using the first time-slot for future data transmissions; and
selecting, by the first wireless communication device, an unused time-slot for future data transmissions.

5. The method of claim 1, further comprising:
removing, by the first wireless communication device, a first reserved time-slot from the third reserved time-slot list upon the occurrence of one or more of the following: the first reserved time-slot not being included on the first reserved time-slot list and the second reserved time-slot list, a determination that the first wireless communication device is no longer interested in transmitting data, and expiration of the first wireless communication device's ownership of the first reserved time-slot.

6. A first wireless communication device that is a node of a vehicle ad-hoc network (VANET), the first wireless communication device comprising:
a receiver configured to:
receive, from a second wireless communication device that is another node of the VANET, a first reserved time-slot list that identifies one or more time-slots that have been reserved for data transmissions within the VANET, and
receive, from a third wireless communication device that is another node of the VANET, a second reserved time-slot list that identifies one or more time-slots that have been reserved for data transmissions within the VANET;
a controller configured to generate a third reserved time-slot list that contains the reserved time-slots that were identified in the first reserved time-slot list and the second reserved time-slot list; and
a transmitter configured to:
broadcast the third reserved time-slot list upon the occurrence of one or more of the following: acceleration of the first wireless communication device, deceleration of the first wireless communication device, and a determination that the first wireless communication device is to be handed over, and
refrain from transmitting data during the reserved time-slots that were identified in the first reserved time-slot list and the second reserved time-slot list.

7. The first wireless communication device of claim 6, wherein the transmitter is further configured to broadcast the third reserved time-slot list in a periodic discovery channel message.

8. The first wireless communication device of claim 6, wherein the broadcast of the third reserved time-slot list includes one or more of the following: a cell identifier, a frame-offset, a priority of the data to be transmitted, and a Quality of Service (QOS) of the data to be transmitted.

9. The first wireless communication device of claim 6, wherein the transmitter is further configured to refrain, if the third reserved time-slot list contains a first time-slot being used by the first wireless communication device for data transmissions, from using the first time-slot for future data transmissions, and
wherein the controller is further configured to select an unused time-slot for future data transmissions.

10. The first wireless communication device of claim 6, wherein the controller is further configured to remove a first reserved time-slot from the third reserved time-slot list upon the occurrence of one or more of the following: the first reserved time-slot not being included on the first reserved time-slot list and the second reserved time-slot list, a determination that the first wireless communication device is no longer interested in transmitting data, and expiration of the first wireless communication device's ownership of the first reserved time-slot.

11. A method comprising:
receiving, at a first wireless communication device that is a node of a vehicle ad-hoc network (VANET) from a second wireless communication device that is another node of the VANET, a first reserved time-slot list that identifies one or more time-slots that have been reserved for data transmissions within the VANET;
receiving, at the first wireless communication device from a third wireless communication device that is another node of the VANET, a second reserved time-slot list that identifies one or more time-slots that have been reserved for data transmissions within the VANET;
generating, by the first wireless communication device, a third reserved time-slot list that contains the reserved time-slots that were identified in the first reserved time-slot list and the second reserved time-slot list;
sensing, by the first wireless communication device, an unused time-slot;
adding the unused time-slot to the third reserved time-slot list;
broadcasting, by the first wireless communication device, the third reserved time-slot list;
refraining, by the first wireless communication device, from transmitting data during the reserved time-slots that were identified in the first reserved time-slot list and the second reserved time-slot list; and
transmitting, by the first wireless communication device, data during the unused time-slot.

12. A first wireless communication device that is a node of a vehicle ad-hoc network (VANET), the first wireless communication device comprising:
a receiver configured to:
receive, from a second wireless communication device that is another node of the VANET, a first reserved time-slot list that identifies one or more time-slots that have been reserved for data transmissions within the VANET,
receive, from a third wireless communication device that is another node of the VANET, a second reserved time-slot list that identifies one or more time-slots that have been reserved for data transmissions within the VANET, and sense an unused time-slot;
a controller configured to:
  generate a third reserved time-slot list that contains the reserved time-slots that were identified in the first reserved time-slot list and the second reserved time-slot list, and
  add the unused time-slot to the third reserved time-slot list; and
a transmitter configured to:
  broadcast the third reserved time-slot list,
  refrain from transmitting data during the reserved time-slots that were identified in the first reserved time-slot list and the second reserved time-slot list, and
  transmit data during the unused time-slot.

* * * * *